April 30, 1968     J. I. FERNANDEZ     3,380,184
ANIMATED FISH LURE
Filed April 19, 1966
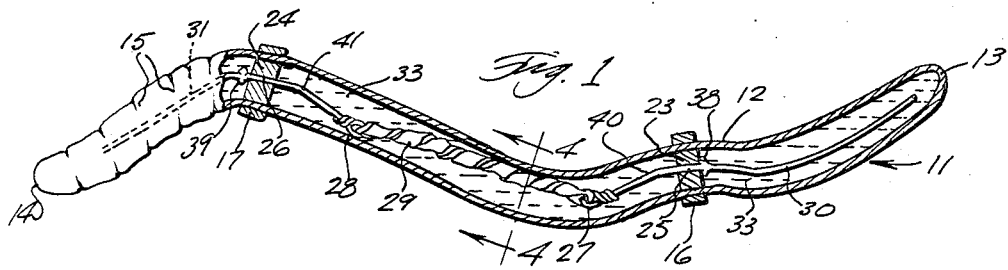
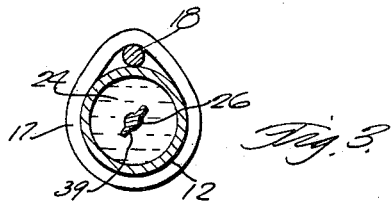
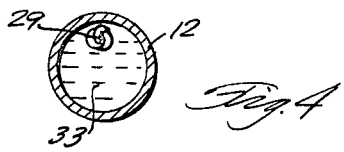
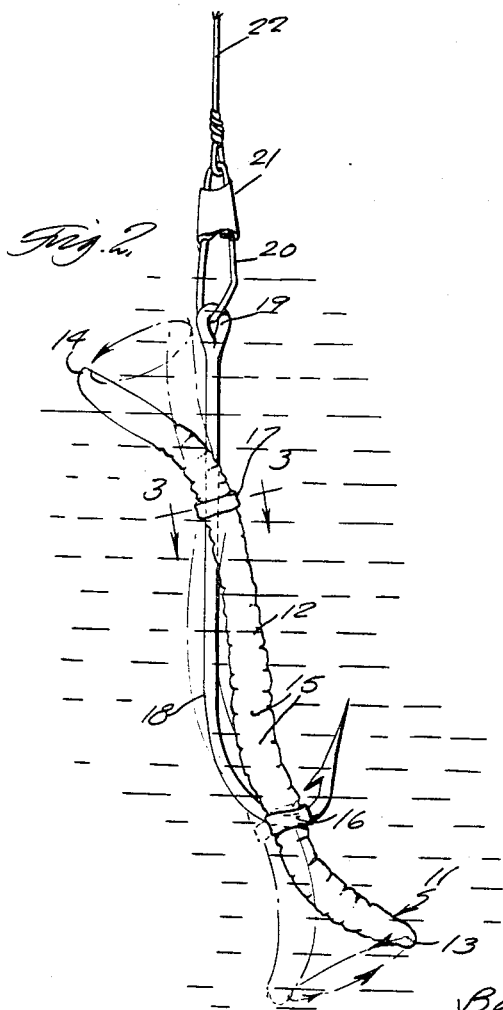
INVENTOR.
JOSEPH I. FERNANDEZ
BY
Berman, Davidson & Berman
ATTORNEYS United States Patent Office 3,380,184
Patented Apr. 30, 1968

3,380,184
ANIMATED FISH LURE
Joseph I. Fernandez, 15415 Woodard Road,
San Jose, Calif. 95124
Filed Apr. 19, 1966, Ser. No. 543,697
8 Claims. (Cl. 43—26.2)

This invention relates to lure devices, and more particularly to a fishing lure in the form of a simulated worm which moves with a wriggling life-like action while under water.

A main object of the invention is to provide an improved animated lure device which is simple in construction, which provides a life-like realistic moving simulation of an actual worm, and which is easy to wind up prior to use.

A further object of the invention is to provide an improved animated lure device in the form of a simulated worm which is provided with means for causing it to wriggle with a life-like action while in the water, the lure device being inexpensive to manufacture, being durable in construction, and being easy to handle.

Further objects and advantages of the invention will become apparent from the following description and claims, and from the accompanying drawings, wherein:

FIGURE 1 is a side elevational view, partly in longitudinal vertical cross-section, showing an improved animated lure device constructed in accordance with the present invention.

FIGURE 2 is a side elevational view of the lure device of FIGURE 1, attached to a fishing hook and suspended from a fishing line, being shown immersed in water as it would be employed in actual use.

FIGURE 3 is an enlarged cross-sectional view taken substantially on the line 3—3 of FIGURE 2.

FIGURE 4 is an enlarged cross-sectional view taken substantially on the line 4—4 of FIGURE 1.

Referring to the drawing, 11 generally designates an improved animated fish lure device constructed in accordance with the present invention, the lure device being in the form of a simulated live worm. The device 11 comprises an elongated tube 12 of flexible plastic material, having tapering closed opposite ends, as shown at 13 and 14, and being molded with simulated spaced grooves or annular creases 15, whereby it resembles a worm in external appearance.

Secured to opposite portions of the tubular casing 12, spaced approximately equal distances from the ends 13 and 14 thereof, are respective rigid rings 16 and 17, which may be metal bands, for example, which serve to clamp the casing 12 to spaced portions of a conventional fishhook 18. Thus, the band 16 may be engaged around the bight portion of the hook and the band 17 may be engaged around the straight shank portion of the hook, as shown in FIGURE 3, whereby the casing 12 is secured to the hook and approximately follows the contour of the shank portion thereof, the lower end thereof depending beneath the bight portion of the hook and the upper end portion thereof extending adjacent the upper end portion of the shank of the hook adjacent to the hook eye portion 19 which is connected to the loop 20 of a conventional fastener 21 connecting the hook to a fishing line 22.

Tightly-secured inside the casing within the rings 16 and 17 are respective circular plugs 23 and 24 in which are journaled wire shafts 25 and 26. The inner portions of the shafts 25 and 26 are formed with bends 40 and 41 and are formed at their inner ends with loops 27 and 28, and a rubber band 29 is connected between said loops, as shown in FIGURE 1. The shaft 25 has a smoothly-curved outer end portion contained within one end of casing 12 and extending adjacent the closed tapered end wall 13 thereof, the wire portion being shown at 30 in FIGURE 1. The opposite wire portion extending from the shaft 26 and shown at 31 extends toward the opposite closing end wall 14 of casing 12 and is likewise somewhat curved, namely, is inclined outwardly away from the axis of the shaft element 26.

It will be noted that both wire end portions 30 and 31 are inclined, to some degree, outwardly away from the axes of the shaft elements 25 and 26. The casing 12 is filled with a suitable relatively viscous liquid 23, for example, a heavy syrup, which serves as a damping means to retard the untwisting of rubber band 29, as will be presently described, so that the simulated worm has a relatively slow wriggling action, and which also acts as a lubricant.

In using the bait 11, the simulated worm is mounted on a hook 18 in the manner illustrated in FIGURE 2, and is wound up by holding one end thereof while rotating the other end so as to twist the internal rubber band 29. After the rubber band 29 has been twisted to a sufficiently tight configuration, the hook and lure device are lowered into the water. Since the simulated worm is released and free to untwist, the ends of the worm rotate slowly in opposite directions and the intermediate portion of the worm flexes somewhat as the twisted rubber band 29 untwists toward its normal straight configuration, because of the inner wire bends 40, 41. The untwisting action of the rubber band and the resultant rotations of the shaft elements 25 and 26 are slowed down by the damping action of the relatively viscous liquid 33 contained in the casing 12, as above-described. As a result, the device wriggles in a fashion simulating the movements of an actual worm. The denser the liquid, the slower will be the wriggling action.

Since the plug members 23 and 24 are held stationary because of their tight engagement inside the casing 12 within the rings 16 and 17, the intermediate portion of the casing between the rings 16 and 17 does not contract when the rubber band 29 is twisted to its wound-up configuration. However, when the rubber band untwists, the intermediate portion of the worm will deform or flex as the rubber band tends to straighten out, adding to the life-like wriggling action provided by the lure device and increasing its resemblance to an actual live worm.

Suitable abutment means are provided on the opposite outer end portions of the shaft elements 25 and 26 to prevent inward retraction of the shaft elements when the elastic band 29 is wound up. Thus, the shaft element 25 is provided with a crimp or enlargement 38 located between the rotating part of the shaft element and the outer wire portion 30, bearing against the plug element 23, and the shaft element 26 is provided with a similar enlargement or crimp 39 located between the rotating portion of the shaft element 26 and the outer wire portion 31.

While a specific embodiment of an improved anmiated lure device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An animated lure device comprising an elongated flexible casing having closed ends and being substantially in the form of a simulated worm, spaced supports mounted in said casing, respective shaft elements journaled substantially axially in said supports and having opposite outer extensions directed toward the respective closed ends of the casing, and an elastic band in the casing connecting said shaft elements and being adapted to be wound up in a twisted configuration by rotating one of the ends of the casing relative to the other end thereof.

2. The animated lure device of claim 1, and a relatively viscous fluid contained in the casing to retard the untwisting action of the elastic band.

3. The animated lure device of claim 2, and wherein said outer extensions are inclined outwardly and away from the axes of the shaft elements.

4. The animated lure device of claim 3, and respective clamping bands surrounding the casing externally adjacent said supports for securing the casing to spaced portions of a fishing hook.

5. The animated lure device of claim 4, and abutment means on the opposite outer end portions of the shaft elements to prevent inward retraction of the shaft elements when the elastic band is wound up.

6. The animated lure device of claim 5, and wherein said supports comprise substantially circular plugs secured to the inside surface of the casing.

7. The animated lure device of claim 6, and wherein said shaft elements are provided with attaching loops at their inner opposing ends, and the ends of the elastic band are respectively secured to said attaching loops.

8. The animated lure device of claim 7, and a fishing hook, one clamping band engaging around the bight portion of the hook and the other clamping band engaging around the upper portion of the shank portion of the hook, whereby to secure the elongated flexible casing to the hook substantially in close adjacency to the lower portion of the shank of the hook and the portion of the bight of the hook merging with the shank.

References Cited
UNITED STATES PATENTS

| | | | |
|---|---|---|---|
| 2,065,337 | 12/1936 | Lee | 46—92 |
| 2,158,860 | 5/1939 | Hyde | 46—123 |
| 2,468,877 | 5/1949 | Horton | 43—42.24 |
| 2,511,154 | 6/1950 | Garland | 46—92 |
| 2,984,927 | 5/1961 | Coulter | 43—26.2 |

ALDRICH F. MEDBERY, *Primary Examiner.*

D. J. LEACH, *Assistant Examiner.*